United States Patent
Osborn et al.

(10) Patent No.: US 12,159,289 B2
(45) Date of Patent: Dec. 3, 2024

(54) PRODUCT AVAILABILITY INFERENCE USING MERCHANT DATA AND WEBSITE INTERACTION

(71) Applicant: Capital One Services, LLC, McLean, VA (US)

(72) Inventors: Kevin Osborn, Newton Highlands, MA (US); Francis Ogbennah, Baltimore, MD (US); Anita Eradla, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 262 days.

(21) Appl. No.: 17/694,093

(22) Filed: Mar. 14, 2022

(65) Prior Publication Data
US 2023/0289830 A1    Sep. 14, 2023

(51) Int. Cl.
*G06Q 30/02* (2023.01)
*G06N 5/04* (2023.01)
*G06Q 30/0201* (2023.01)

(52) U.S. Cl.
CPC ........... *G06Q 30/0201* (2013.01); *G06N 5/04* (2013.01)

(58) Field of Classification Search
CPC ...................................................... G06Q 30/02
See application file for complete search history.

(56) References Cited

U.S. PATENT DOCUMENTS

| | | | | |
|---|---|---|---|---|
| 7,818,209 B1* | 10/2010 | Lu | ......................... | G06Q 30/02 705/14.54 |
| 7,904,975 B2* | 3/2011 | Kruglikov | .......... | G06Q 30/0617 5/28 |
| 8,620,767 B2* | 12/2013 | Linden | ............... | G06Q 30/0253 705/26.1 |
| 8,700,495 B2* | 4/2014 | Battle | .................... | G06Q 30/00 707/706 |
| 10,643,269 B2* | 5/2020 | Weber | ................ | G06Q 30/0643 |
| 11,783,406 B1* | 10/2023 | Hsiao | .................... | H04L 63/102 705/26.61 |
| 11,948,162 B2* | 4/2024 | Colombier | ......... | G06Q 30/0643 |
| 2010/0191619 A1* | 7/2010 | Dicker | .............. | G06Q 30/0603 705/26.1 |
| 2013/0006916 A1* | 1/2013 | McBride | ............ | G06Q 30/0629 706/52 |
| 2015/0073929 A1* | 3/2015 | Psota | ................. | G06Q 30/0201 705/26.2 |
| 2015/0100459 A1* | 4/2015 | Linden | ............... | G06Q 30/0633 705/26.8 |

(Continued)

FOREIGN PATENT DOCUMENTS

WO    WO-2019195263 A1 * 10/2019    ........... G06Q 20/355

OTHER PUBLICATIONS

Andrew D. Zimbroff and Marilyn R. Schlake, Introduction to Pricing for a Product or Service, Institute of Agriculture and Natural Resources, The Board of Regents of the University of Nebraska, 2015. (Year: 2015).*

*Primary Examiner* — Kurtis Gills

(74) *Attorney, Agent, or Firm* — Banner & Witcoff, Ltd.

(57) ABSTRACT

Aspects described herein relate to methods, systems, and apparatuses that track the availability of items from multiple vendors based on website browsing records from multiple users, and provide alerts to users when an out-of-stock item becomes available.

20 Claims, 8 Drawing Sheets

(56) References Cited

U.S. PATENT DOCUMENTS

| | | | |
|---|---|---|---|
| 2016/0086222 A1* | 3/2016 | Kurapati | G06Q 40/08 |
| | | | 705/14.53 |
| 2019/0236740 A1* | 8/2019 | Rao | G06Q 10/06315 |
| 2020/0014671 A1* | 1/2020 | Isaacson | G06Q 20/20 |
| 2020/0219171 A1* | 7/2020 | Zhuang | G06Q 30/0639 |
| 2020/0286124 A1* | 9/2020 | Hiremath | G06N 5/048 |
| 2021/0056570 A1* | 2/2021 | Balakrishnan | G06Q 30/0631 |
| 2022/0067085 A1* | 3/2022 | Nihas | G06Q 10/0875 |
| 2023/0214774 A1* | 7/2023 | Loi | G06Q 10/0875 |
| | | | 705/29 |

* cited by examiner

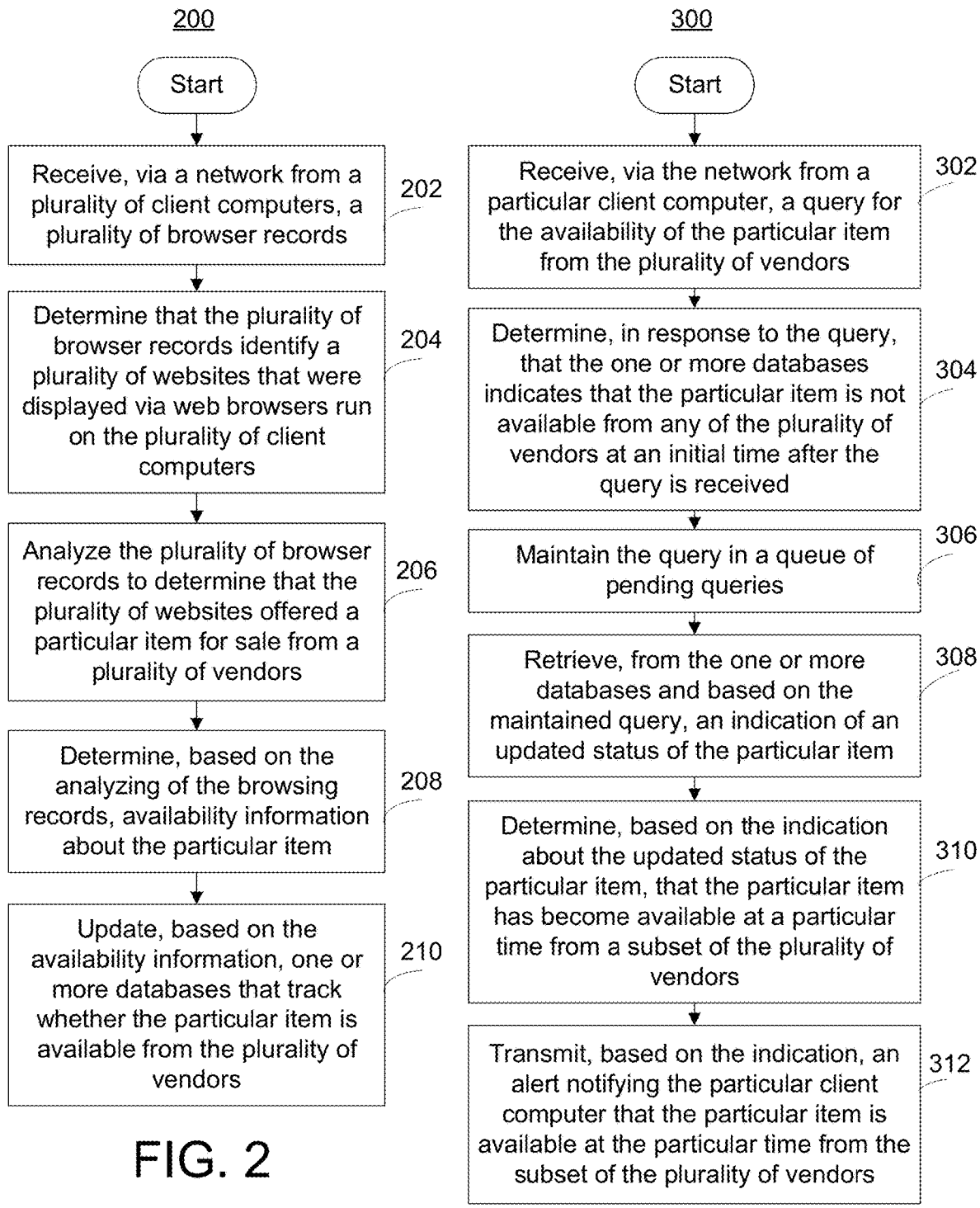

PRODUCT AVAILABILITY INFERENCE USING MERCHANT DATA AND WEBSITE INTERACTION

TECHNICAL FIELD

Aspects described relate generally to correlating transaction records and crowd sourced data to infer line item transaction data and item availability.

BACKGROUND

When shopping for a product on-line, a would-be purchaser often has to make several selections (clicks) into a product webpage, or has to place the product into a shopping cart, to determine whether the product is actually in-stock and available for purchase. If the item is not available from one vendor, websites of different vendors need to each be browsed to determine which vendors have the product for sale. And, if the product is not available from any vendor, the user has to repeat the entire process (often numerous times) until stock of the product is replenished at one or more of the vendors. Even then, if stock is limited, and the product is popular, the user would face competition with other consumers in finding and purchasing the product before stock runs out again. This can be cumbersome and time consuming, especially for hard-to-find items and for comparing prices of in-stock items at different vendors.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein include methods and systems that provide new capabilities for tracking the availability of a particular item from a plurality of vendors. The tracking includes receiving, via a network from a plurality of client computers, a plurality of browsing records indicating that a plurality of websites were displayed via web browsers run on the plurality of client computers. The browsing records may be analyzed to determine that the plurality of websites offered the particular item for sale from multiple vendors. Based on this analysis, availability information about the particular item may be determined, and one or more databases that track an availability of the item may be updated based on this information. Because the browsing records may be collected from a large number and wide variety of client computers as the records are created and analyzed in near real-time, the availability information has a higher chance of being current and correct when utilized by a user to find the item from a vendor or supplier.

To this end, further systems, methods and techniques relate to receiving, from a particular client computer, a query for the availability of the particular item. Based on the availability information stored in the one or more databases, an indication that the particular item is available at a particular time from a subset of the plurality of vendors may be retrieved. An alert notifying the particular client computer that the particular item is available at the particular time from the subset of the plurality of vendors may then be transmitted in response to the query. The updating of availability information, which may be in near real-time, combined with the alert capabilities is advantageous in saving users time and effort in searching through multiple websites to determine if a particular item is in stock and available for purchase. This is especially advantageous for a user competing with others attempting to manually search and acquire the same hard-to-find product that is out-of-stock, but becomes available from one or a small number of suppliers.

Additional aspects relate to deriving availability information about a product by correlating the browsing records with transaction records of actual purchases and inventory data provided by businesses and vendors. For example, a credit card transaction record may reflect a total price of a purchase from a particular vendor, and that total price may be correlated with combinations of prices (discerned from the browsing records) of individual items from that vendor, and/or correlated with browsing records that indicate certain items recently browsed by a user, to deduce particular items that were included in the purchase. This item purchase information may be used as an indication of product availability as discussed above.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 2 illustrates an example method for using browsing records to determine availability information of an item from a vendor according to one or more aspects of the disclosure.

FIG. 3 illustrates an example method for notifying a client computer of a status of an item from a vendor according to one or more aspects of the disclosure.

DETAILED DESCRIPTION

Figure 1A:
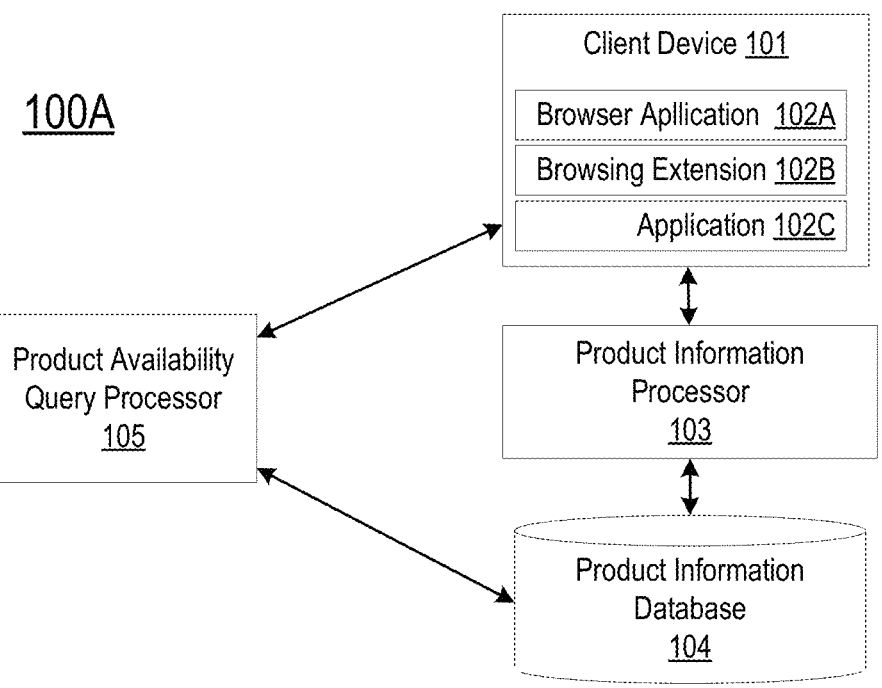
FIGS. 1A and 1B illustrates block diagrams of example systems in which one or more aspects may be performed.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting.

Methods and systems described herein provide new capabilities for tracking a particular item available from a plurality of vendors via a plurality of websites. The tracking includes receiving, via a network from a plurality of client computers, a plurality of browsing records indicating that the plurality of websites were displayed via web browsers run on the plurality of client computers. The plurality of browsing records may be analyzed to determine that the plurality of websites offered the particular item for sale from the plurality of vendors. Based on this analysis, availability information about the particular item may be determined, and one or more databases that track availability of the particular item from the plurality of vendors may be updated based on the availability information.

Further systems, methods and techniques may relate to receiving, via the network from a particular client computer, a query for the availability of the particular item from the plurality of vendors. Based on the query, an indication that the particular item is available at a particular time from a subset of the plurality of vendors may be retrieved from one or more databases, and an alert notifying the particular client computer that the particular item is available at the particular time from the subset of the plurality of vendors may be transmitted. The near immediate updating of availability information combined with the alert capabilities proves advantageous for a user competing with others who manually search and attempt to acquire the same hard-to-find product that is out-of-stock, but that becomes available at some point in the future.

Additional aspects relate to deriving availability information about a product by correlating the browsing records with transaction records of actual purchases and inventory data provided by businesses and vendors. For example, a credit card transaction record may reflect a total price of a user's purchase from a particular vendor, and that total price may be correlated with combinations of prices of individual items from that vendor. Total price in the transaction record may additionally or alternatively be with browsing records indicating certain items that a particular user recently browsed to deduce particular items the user purchased. This item purchase information may be used to provide an indication of product availability as discussed above. The item purchase information may further be used in other applications, such as determining shopping habits of the user, formulating special offers for the user, or performing market research for a particular product.

FIG. 1A depicts a block diagram of an example system 100A for collection browsing records, determining product availability, and providing availability alerts to a client device. System 100A may include one or more (only one is illustrated) client devices 101 (e.g., mobile phone, tablet, laptop, desktop, etc.), which implement one or more applications 102A-C for displaying web pages or graphical user interfaces that depict or provide information about products offered by one or more vendors or suppliers. Application 102A may include for example, a browser application for retrieving and viewing web pages (e.g., from web servers over the Internet). Application 102C (e.g., a mobile application run on a smart phone) may include a program that provides a graphical user interface displayed by the client device 101 (e.g., smart phone), for viewing and/or purchasing items, for example, from a specific vendor. Application 102B may be a browsing extension, that adds to the capabilities of application 102A and application 102C, for example, by monitoring information displayed by application 102A and application 102C and/or providing additional displayed information (e.g., pop ups, overlays, separate windows, etc.) and/or providing additional selectable options (e.g., hyperlinks, selectable icons, etc.) in relation to information received or displayed by applications 102A and 102C.

Each of applications 102A, 102B, and 102C implemented on each of the client devices 101 may be configured to generate browsing records, each of which including information about webpages or information that was retrieved and/or displayed by the client devices, and that pertains to items available from vendors and/or suppliers. The browsing records may include information specific to a particular item and particular vendor or supplier, such as whether the item is available from (e.g., for purchase), or in-stock at, the vendor or supplier, a quantity of stock at the vendor or supplier, a date in the future of when the item will be available from the vendor or supplier, and/or a cost for purchasing the item from the vendor. The browsing records may also include information specific to a client device 101, such as, how often or how many times information about a particular item was displayed by the client device, when the information about a particular item was displayed, whether the item was selected for purchase via the application on the client device, whether a purchase of the item was completed via the application on the client device, whether the item was viewed with other items, whether the item was viewed within a particular duration of viewing other items, and/or whether the item was purchased with other items via the application on the client device.

The client devices 101 may communicate, via a network, with a product information processor 103, which may receive the browsing records (e.g., periodically, in response to polling, or in near real-time after being created) generated by the plurality of client devices 101, and process the browsing records (for example according to method 200 illustrated in FIG. 2) to determine the availability of different items from different vendors. Product information processor 103 may store (e.g., by writing directly or by transmitting via a network) information about the availability of different items from different vendors in a product information database 104. The availability information may be unique to an individual vendor or apply to a subset of all tracked vendors and include details such as whether an item is in stock, a quantity of stock, dates of when an out-of-stock item will be in-stock, a date and/or time when an item was last identified as being purchased by a client device, etc. Client devices 101 may provide, and product information processor 103 may collect and analyze, the browsing records on a continual and/or real-time (or near real-time) basis to maintain an up-to-date availability status of items in product information database 104.

The client devices 101 may also communicate, via a network, with product availability query processor 105, which may receive queries from client devices 101 regarding whether a particular item is available (e.g., in-stock), presently or in the future, from any vendor or particular vendors. Product availability query processor 105 may, based on or in response to a query, access the availability information stored in product information database 104 to determine the availability of a particular item and provide alerts regarding the item's availability to the client devices (for example, in accordance with method 300 in FIG. 3. The queries may be generated by the same or different client devices that generate the browsing records, and may include information about a particular item, such as name, model number, size, color, etc. The queries may also include other information, such as a particular vendor (or vendors) from which availability information is sought.

Figure 1B:
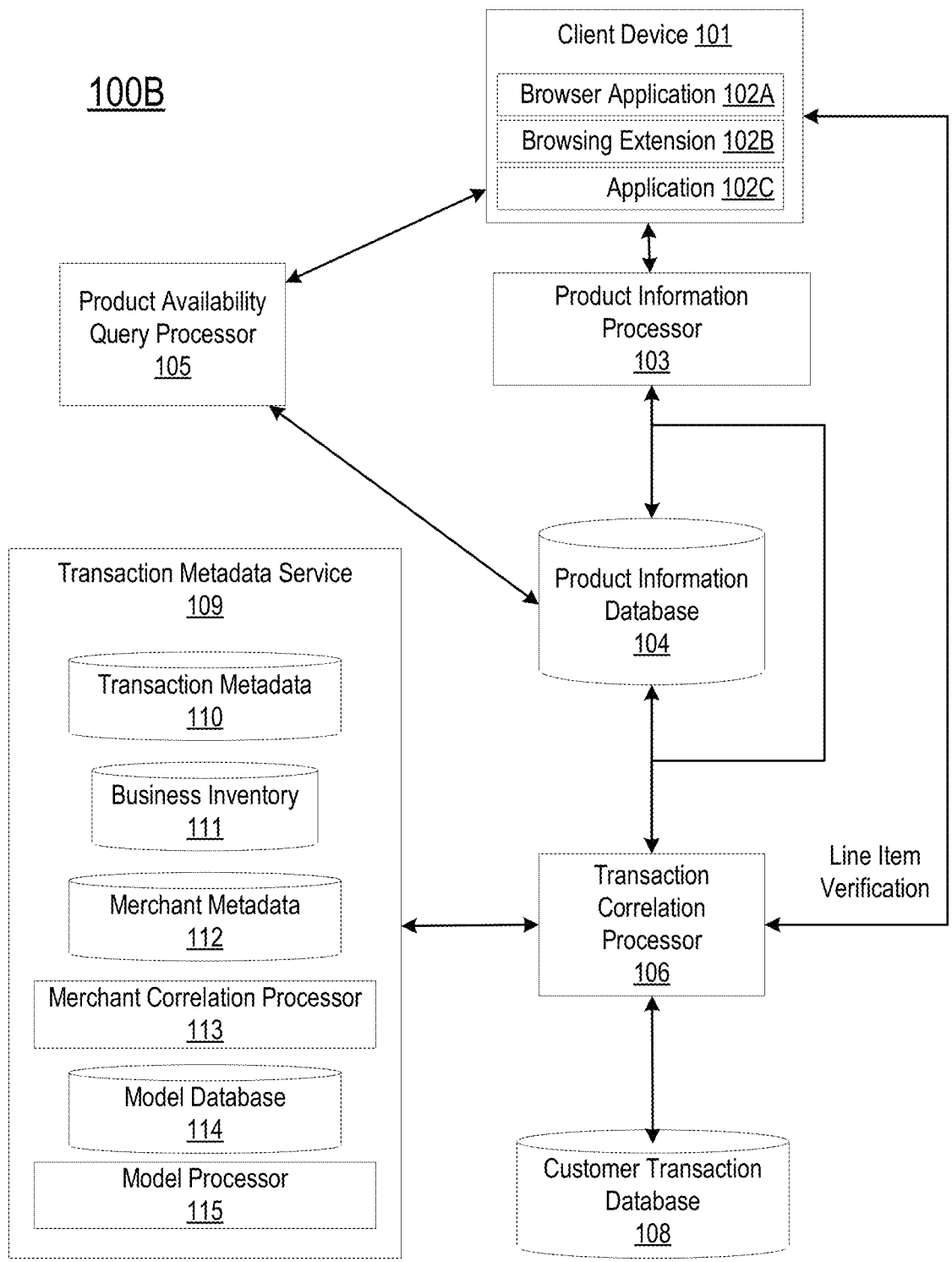

FIG. 1B depicts a block diagram of another example system 100B, which includes the same components 101, 103, 104, and 105 as in system 100A in FIG. 1A, and which includes additional components for determining item availability based on transaction records (e.g., credit card records). System 100B may include a transaction correlation processor 106, which may receive information about specific transactions for items from vendors. This information may include, for example, information about a credit card transaction that includes data, such as the total price of a transaction, credit card information, and information about a user or entity to which the credit card is issued. Such information may be generated by vendors directly reporting transactions, credit card providers, and/or electronic payment service companies that provide for secure on-line payments. The information may be stored as transaction records in a customer transaction database 108.

Figure 4:
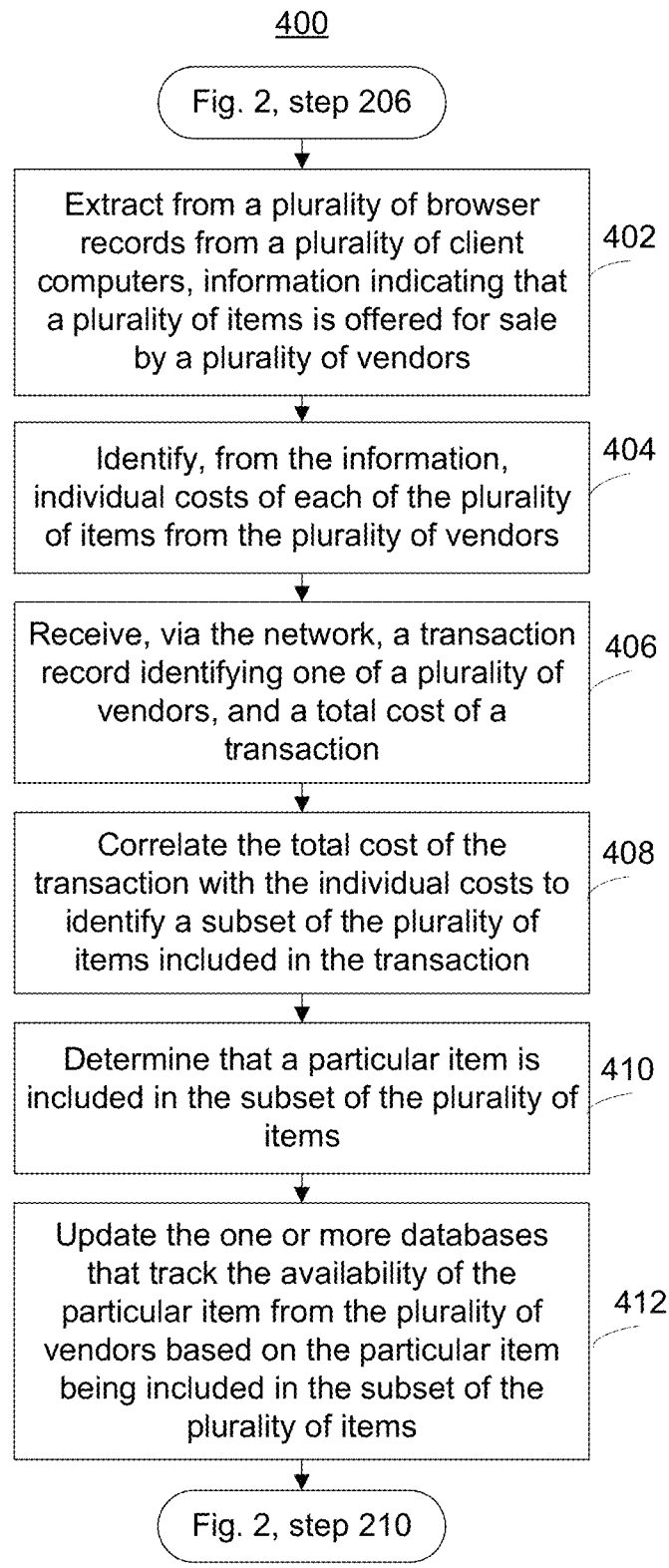
FIG. 4 illustrates an example method for inferring availability of an item from transaction records according to one or more aspects of the disclosure.
Figure 5:
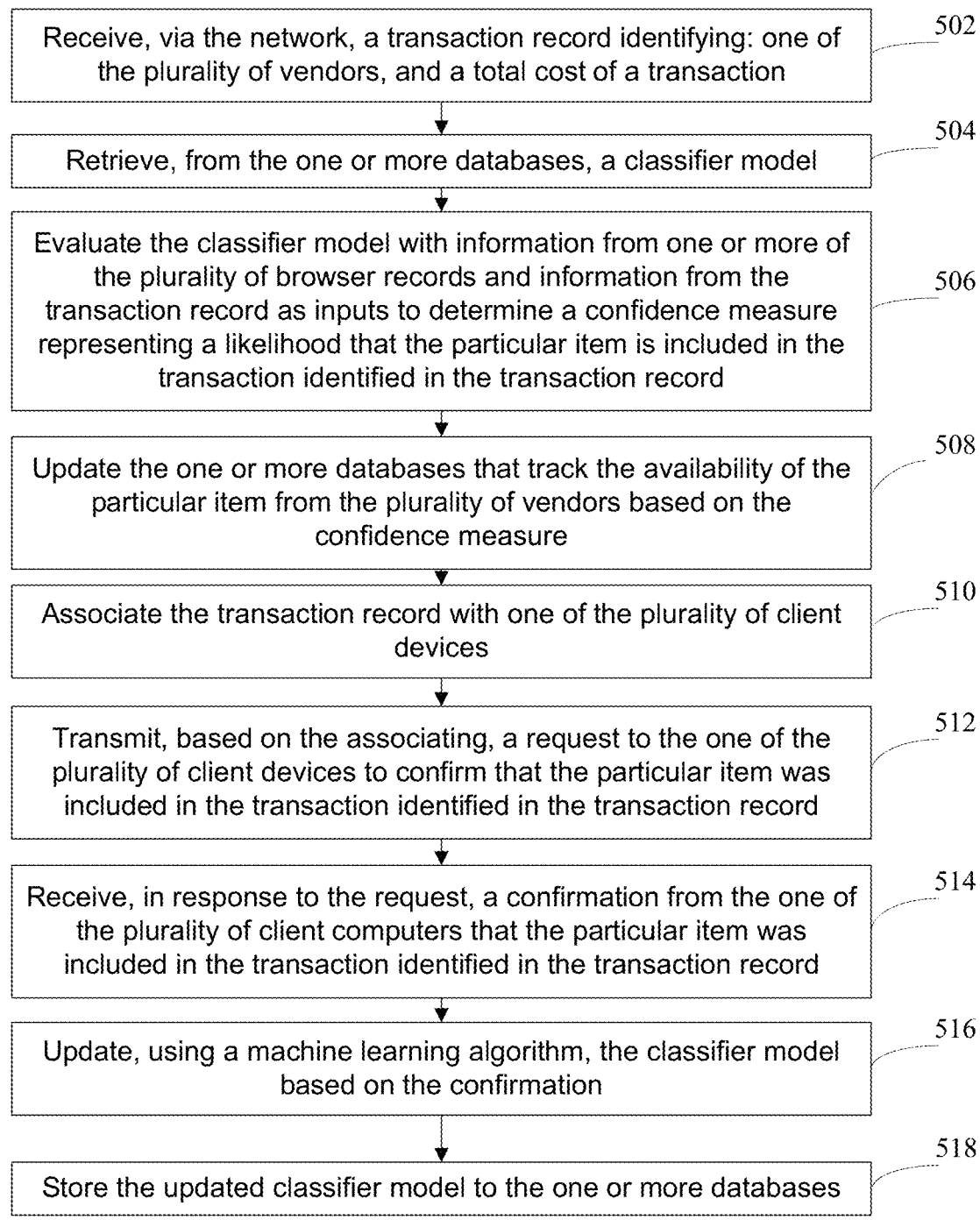
FIG. 5 illustrates an example method for identifying items in a transaction by correlating a total cost of the transaction to item information provided in browsing records according to one or more aspects of the disclosure.
Figure 6:
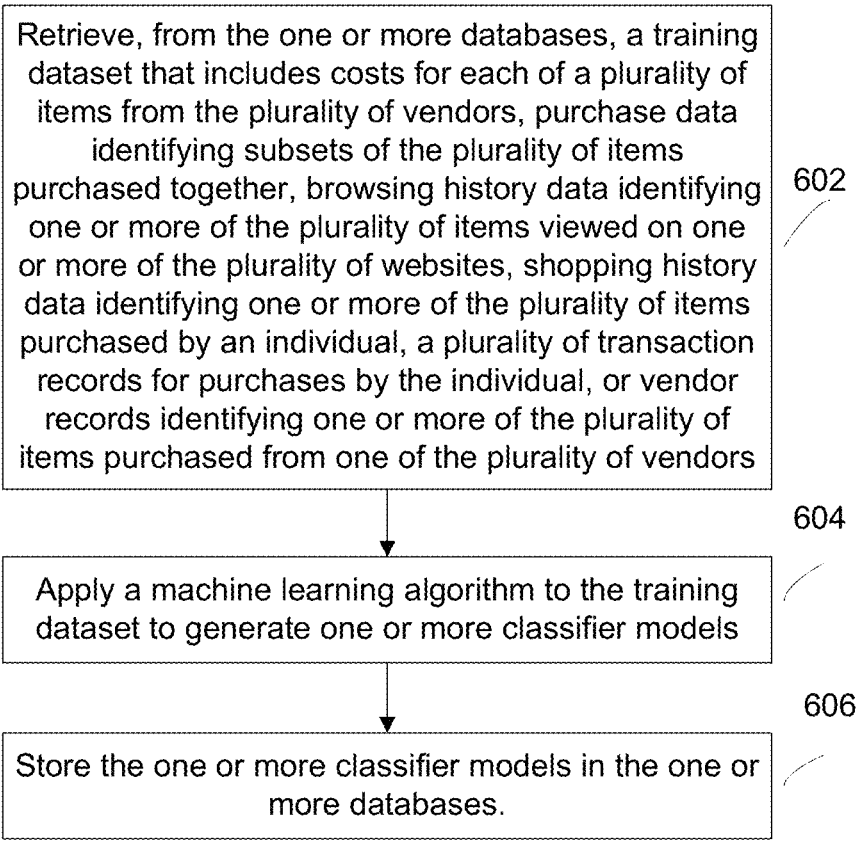
FIG. 6 illustrates an example method of generating a classifier model for identifying items in a transaction according to one or more aspects of the disclosure.

Transaction correlation processor 106 may determine information about the availability of items by correlating information in the transaction records with information in the browsing records according to methods 400, 500, and 600 illustrated in FIGS. 4, 5, and 6, respectively. For example, transaction correlation processor 106 may correlate the total cost of a transaction in a transaction record, with individual costs of items available from a vendor (as determined from browsing records), to determine which items were included in the transaction. Transaction processor 106 may determine availability information about a particular item based on that item being included in a recent transaction, and that availability information may be stored in product information database 104 and/or shared with product information processor 103.

System 100B may additionally include a transaction metadata service, which includes a number of processors and databases for supporting transaction correlation processor 106. While these processors and databases are grouped as part of transaction metadata service 109, the processors and databases may be implemented individually or grouped in any other arrangement.

Transaction metadata service 109 may include a transaction metadata database 110, which may include transaction and/or shopping history of one or more users or client devices 101, which may be used by transaction correlation processor 106 in the correlation and determination of items in a transaction as described below with respect to method 400 illustrated in FIG. 4.

The transaction metadata service 109 may also include a business inventory database 111, which may include information (e.g., a snapshot) from one or more vendors of inventory at a particular time (or range of times) from which transaction correlation processor 106 may verify if it correctly correlated transaction records with browsing records. Transaction correlation processor 106 may also receive the same or similar information with line item verifications directly from client devices 101. The vendor inventory information and verifications can be used to adjust and improve the rules or models used by transaction correlation processor 106 in performing the correlations as described below with respect to methods 400 and 500 illustrated in FIGS. 4 and 5, respectively.

The transaction metadata service 109 may also include a merchant metadata database 112, which may store information that can be used to associate different vendors/suppliers with different transactions. For example, the same vendor may be identified in different transaction records with different labels, where the differences are based on specific vendor branches, locations, etc., and the merchant metadata may provide a correlation between the different information and labels of the same vendor. This information enables transaction correlation processor 106 (with optionally merchant correlation processor 113) to designate transactions identified with different information as being with the same vendor.

Transaction metadata service 109 may further include a model database 114, which stores one or more classifier models used by transaction correlation processor 106 for correlating information in transaction records to information in browsing records as described below with respect to method 500 illustrated in FIG. 5. The classifier models, for example, may be a set of rules generated by a person or a machine-learning model (e.g., naïve Bayes classifier). The classifier models may be generated with a model processor 115, using machine learning techniques, for example, as described below with respect to method 600 illustrated in FIG. 6. The generation of the classifier models may be based on training datasets, which may also be stored in model database 114, and based on line item verifications of certain transactions (e.g., as provided by client devices 101) and vendor inventory (e.g., as stored in business inventory database 111).

FIG. 2 illustrates an example method 200 that may be used for determining availability of a product based on browsing records of one or more client devices. In some variations method 200 may be implemented by one or more suitable computing devices, for example, by product information processor 103 as shown in FIG. 1A implemented with any one of computing devices 701, 705, 707, and 709 of FIG. 7. In other variations, method 200 may be implemented by other suitable computing devices, such as one or more client devices 101, product information database 104, or product availability query processor 105 implemented with any one of computing devices 701, 705, 707, and 709 of FIG. 7. Further variations may include method 200 performed by any combination of 101, 103, 104, and 105. Method 200 may be implemented in suitable computer-executable instructions, such as in software 727, 729, 739, 741, and 743, and include access of one or more databases (e.g., 104) as illustrated in FIG. 1A.

In method 200, at step 202, one or more computing devices (e.g., product information processor 103) may receive, via a network from a plurality of client devices 101, a plurality of browsing records. The browsing records may provide information about content (e.g., web content) received by the plurality of client devices 101 (e.g., via a network 703 illustrated in FIG. 7). The information may, for example, be content displayable with a web browser (e.g. 102A), a browsing extension (e.g., 102B), and/or an application (e.g., 102C) (e.g., run on a mobile device).

At step 204, the one or more computing devices (e.g., 103) may determine that the plurality of browsing records identify a plurality of websites that were displayed via web browsers run on the plurality of client computers. The records may include, for example, browsing history data identifying one or more of the plurality of websites. The one or more computers may further or alternatively determine that the browsing records identify an application (e.g., 102C) run on a client device 101 (e.g., a mobile application run a mobile device) and indicate information displayed by the applications.

At step 206, one or more computing devices (e.g., 103) may analyze the plurality of browsing records to determine that the plurality of websites and/or applications offered a particular item for sale from a plurality of vendors or suppliers. For example, the browsing records may include information identifying one or more of the plurality of items viewed on one or more of the plurality of websites, shopping history data identifying one or more of the plurality of items purchased by an individual, data identifying one or more of the plurality of items selected in a website or mobile application for purchase (but which may not yet be purchased), individual costs for each of a plurality of items from the plurality of vendors, and purchase data identifying subsets of the plurality of items purchased together.

At step 208, one or more computing devices (e.g., 103) may determine, based on the analysis of the browsing records, availability information about the particular item. For example, based on a browsing record indicating an item was purchased from a particular vendor, the system may determine that the item is available for future purchase. As another example, items placed in a website shopping cart may indicate that the item is available for purchase. As a further example, a website or mobile application may provide a quantity in-stock of a particular item. This information may, in some examples, provide availability information based on a location of a particular store of a plurality of stores of a particular vendor.

At step 210, one or more computing devices (e.g., 103) may update, based on the availability information, one or more databases that track and store information about whether the particular item is available from the plurality of vendors. Method 200 may thus pool (e.g., crowdsource) information from many different client devices 101 viewing item information from many different vendors (e.g., via websites and applications), which may then be provided to users (e.g., via a client device 101) to find a particular item in stock.

For example, FIG. 3 illustrates method 300 that may be used for notifying users (e.g., via a client device (e.g., 101) of a status of an item from a vendor based on availability information in a database (e.g., information in database 104 generated in method 200). In some variations method 300 may be realized by one or more suitable computing devices, for example by product availability query processor 105, as shown in FIG. 1A implemented with any one of computing devices 701, 705, 707, and 709 of FIG. 7. In other variations, method 300 may be realized by other suitable computing devices, such as one or more client devices 101, product information processor 103, or product information database 104 implemented with any one of computing devices 701, 705, 707, and 709 of FIG. 7. Further variations may include method 300 performed by any combination of 101, 103, 104, and 105. Method 300 may be implemented in suitable computer-executable instructions, such as in software 727, 729, 739, 741, and 743, and include access to one or more databases (e.g., product information database 104) as illustrated in FIG. 1A.

In method 300, at step 302, one or more computing devices (e.g., product availability query processor 105) may receive, via the network from a particular client device 101, a query for the availability of a particular item from a plurality of vendors. The query may be made with a specific request initiated by a user. For example, application (web browser) 102A, application (browser extension) 102B, or application 102C may provide a search function through which a user may enter (e.g., via a keyboard, mouse click, or voice recognition) a description of an item, which creates a query transmitted to product availability query processor 105 or another computing device (e.g., product information database 104).

As another example, the query may be made autonomously. For example, a browsing extension (e.g., application 102B) implemented with client device 101 may monitor information from websites or applications visited, displayed, or run on client device 101 (e.g., text or images displayed on a webpage displayed on a monitor) about items potentially in stock at, or available from, vendors. For example, websites may be viewed on a client device that specifically offer an item for sale from a particular vendor. Alternatively, a website (e.g., a manufacturer's website) may contain information about the item, but the website is not associated with a vendor and is not offering the item for sale. In response to detecting information about an item, the browsing extension (application 102B) may automatically generate and/or transmit a query to product availability query processor 105 or another computing device (e.g., product information database 104) for information about the availability of the item from vendors.

At step 304, one or more computing devices (e.g., product information database 104 and/or product availability query processor 105) may determine, based on the query, that one or more databases (e.g., product information database 104) indicate that the particular item is not available from any of the plurality of vendors at an initial time after the query is received. For example, a website may provide information about an item indicating it is not yet released for sale by a manufacturer (e.g., next year's car model), information about an item for which there is currently a shortage of (i.e., a newly released video game console), or information about an item that is simply out of stock.

At step 306, one or more computing devices may maintain the query in a queue of pending queries. The queue may, for example, designate multiple queries as being in a certain order or priority for which they will be evaluated in the future. Alternatively, the queries may have no designated order or priority in the queue.

At step 308, one or more computing devices (e.g., product information database 104 and/or product availability query processor 105) may retrieve, from the one or more databases and based on the maintained query, an indication of an updated status of the particular item. As discussed above with respect to method 200, the availability information may be continually generated by collecting and analyzing browsing records of other client devices 101, and the updated status may be based on this updated availability information. Step 308 may be performed once, or repeatedly (e.g., periodically). The frequency and order in evaluating the query may depend on the queries order or priority in the queue, with for example, higher priority queries being evaluated more frequently than others.

At step 310, one or more computing devices (e.g., product information database 104 and/or product availability query processor 105) may determine, based on the indication about the updated status of the particular item, that the particular item has become available at a particular time from a subset of the plurality of vendors. The subset may include one or all of the plurality of vendors.

At step 312, one or more computing devices (e.g., product information database 104 and/or product availability query processor 105) may, based on the indication, transmit (e.g., immediately after the particular time) an alert notifying the client device 101 that sent the query (or multiple client devices 101) that the particular item is available (e.g., as of the particular time) from the subset of the plurality of vendors. The alert may, for example, be an instruction or indication for client device 101 to provide a visual or audible indicator displayed or emitted, respectively. The visual display may for example be a pop-up window on a computer display, a pop-up icon on a mobile phone, or similar indicator, and may be interactive or selectable (e.g., a hyperlink) to cause further action by the client device 101. For example, selection of, or response to, the indicator (e.g., with a mouse click, touch screen tap, or voice command) may provide more information about the current availability of the item from one or more vendors, and include other information, such as price of the item from different vendors, delivery time, shipping cost, etc.

In some variations the alert may include instructions triggering the client device 101 to display a list of vendors (e.g., via a web page or mobile application display) that have the item in stock or are otherwise offering the item (e.g., for sale). In some variations, the alert may trigger a browsing extension (application 102B) to modify a display of a particular vendor's website or vendor's mobile application to include availability information from other vendors. For example, a client device 101 may be displaying a particular vendor's webpage that is indicating a current stock (or lack of stock) of a particular item, and the browsing extension may augment the display of the particular vendor's webpage to display current stock from competing vendor's, which is provided in the alert. This augmentation may include other information about the item from multiple vendors, such as price, lead time, etc.

By automatically providing up to date information about availability (e.g., of out-of-stock) items via client device 101, significant effort and time of a user can be saved, since the user no longer has to visit each vendor's website or application to determine if a particular item is available. Moreover, when competing with others to acquire limited quantity items, users of a system implementing method 300 (via client device 101) have a distinct advantage over others who do not have access to such a system, by being informed sooner of when an unavailable item becomes available, thus increasing the user's odds of acquiring the limited-quantity item from the vendor before the item becomes out-of-stock again.

In previous method 200, determining if an item is available form a vendor is based on scraping information from browsing records of multiple different client devices 101. FIG. 4 illustrates an example alternative method of performing step 208 for inferring availability of an item by also considering transaction records (e.g., credit card records, electronic payment service records, bank records, or vendor records) in addition to browsing records. Prior to performing method 400, steps 202, 204, and/or 206 may have been previously performed (e.g., by product information processor 103), to receive and analyze the browsing records as described above. In some variations method 400 may be implemented by one or more suitable computing devices, for example by transaction correlation processor 106 (as shown in FIG. 1B) in conjunction with product information processor 103 and various processors and databases of transaction metadata service 109 and customer transaction database 108. Each of the processors and databases may be implemented with any one of computing devices 701, 705, 707, and 709 of FIG. 7. Method 400 may be implemented in suitable computer-executable instructions, such as in software 727, 731, 735, 741, and 743.

In method 400, at step 402, one or more computing devices may extract from a plurality of browsing records from the plurality of client devices 101, information indicating that a plurality of items is offered for sale by a plurality of vendors. At step 404, one or more computing devices may identify, from the information, individual costs of each of the plurality of items from the plurality of vendors. For example, the browsing records may include information from a vendor's webpage that offers a particular item for sale, provides a cost of the item, and provides (when the item is in-stock and available) an option to select the item for purchase (e.g., to place the item in a shopping cart of the website).

At step 406, one or more computing devices (e.g., transaction correlation processor 106) may receive, via the network, a transaction record (e.g., a credit card receipt from customer transaction database 108) identifying one of a plurality of vendors, and a total cost of a transaction. The transaction record may additionally include other information, such as a credit card number, an account number, a user or entity to which the credit card is issued, time of the transaction, etc.

At step 408, one or more computing devices may correlate the total cost of the transaction with the individual costs to identify a subset of the plurality of items included in the transaction. For example, product information processor 103 and or transaction correlation processor 106 may compile a list of items and individual item costs from browsing records in step 402 for a particular vendor, and cross-correlate different combinations of those item costs with the total cost of the transaction with the same vendor.

Step 408 may include the one or more computing devices accessing merchant metadata database 112 and or information exchanged with merchant correlation processor 113 to associate the name of the vendor in the transaction record with the names of the vendors in the browsing records, which may be different, but refer to the same vendor. Step 408 may further include accessing transaction metadata database 110, which may include transaction or shopping history of a particular user or client device 101, and basing the correlation and selection of the subset on a particular user's or client device's shopping habits. For example, if a particular vendor sells two products for the exact same price, and a client device 101 has a history of purchasing one of those items but not the other, the item that has been previously purchased may be selected for inclusion in the subset over the item that has not been previously purchase. Selecting the particular user may include determining an identity of the user or entity indicated in the transaction record. Step 408 may also include the one or more computers accessing business inventory database 111, which may include information about the types of items (e.g., clothing, tires, candles, etc.) a particular vendor sells, and information about which items were in stock at a particular vendor at the time of the transaction. This information may be used, for example, to select an item for inclusion in the subset over another item (e.g., having the same price) that was not the type of item sold by the vendor or was not in-stock at the time of the transaction indicated in the transaction record.

At step 410, one or more computing devices may determine that a particular item is included in the subset of the plurality of items based on the correlation determined in step 408. For example, the one or more computing devices may then select the combination of items with costs that have the highest correlation (e.g., 100% correlation, e.g., where sum cost of the items equals the total cost in the transaction record) or a correlation above a threshold (e.g., 95% correlation), as the subset of items that were included in the transaction.

In step 412, the one or more computing devices may update the one or more databases that track the availability of the particular item from the plurality of vendors based on a particular item being included in the subset of the plurality of items. For example, transaction correlation processor 106 may communicate a list of the subset to product information processor 103, which may update information about the availability of the particular item in product information database 104. Alternatively, transaction correlation processor 106 may update product information database 104 directly with this information.

The addition of method 400 to method 200 enables the system to derive more availability information than browsing records alone, which may provide some data about items, such as cost, but not provide information on actual availability of the item. Moreover, implementing method 400 with current transaction records in near-real-time may provide more current information about the availability of items, which may improve the usefulness and immediacy of method 300 for alerting a user of when an item becomes available.

In addition to tracking the availability of a particular item, the determination of a subset of items included in a transaction in step 408 may be applied in other processes, such as the one or more computing devices determining shopping habits of a user by finding a pattern of the user purchasing a particular product, formulating special offers for the user for an item that is bought repeatedly, or performing market research for a particular product.

Figure 7:
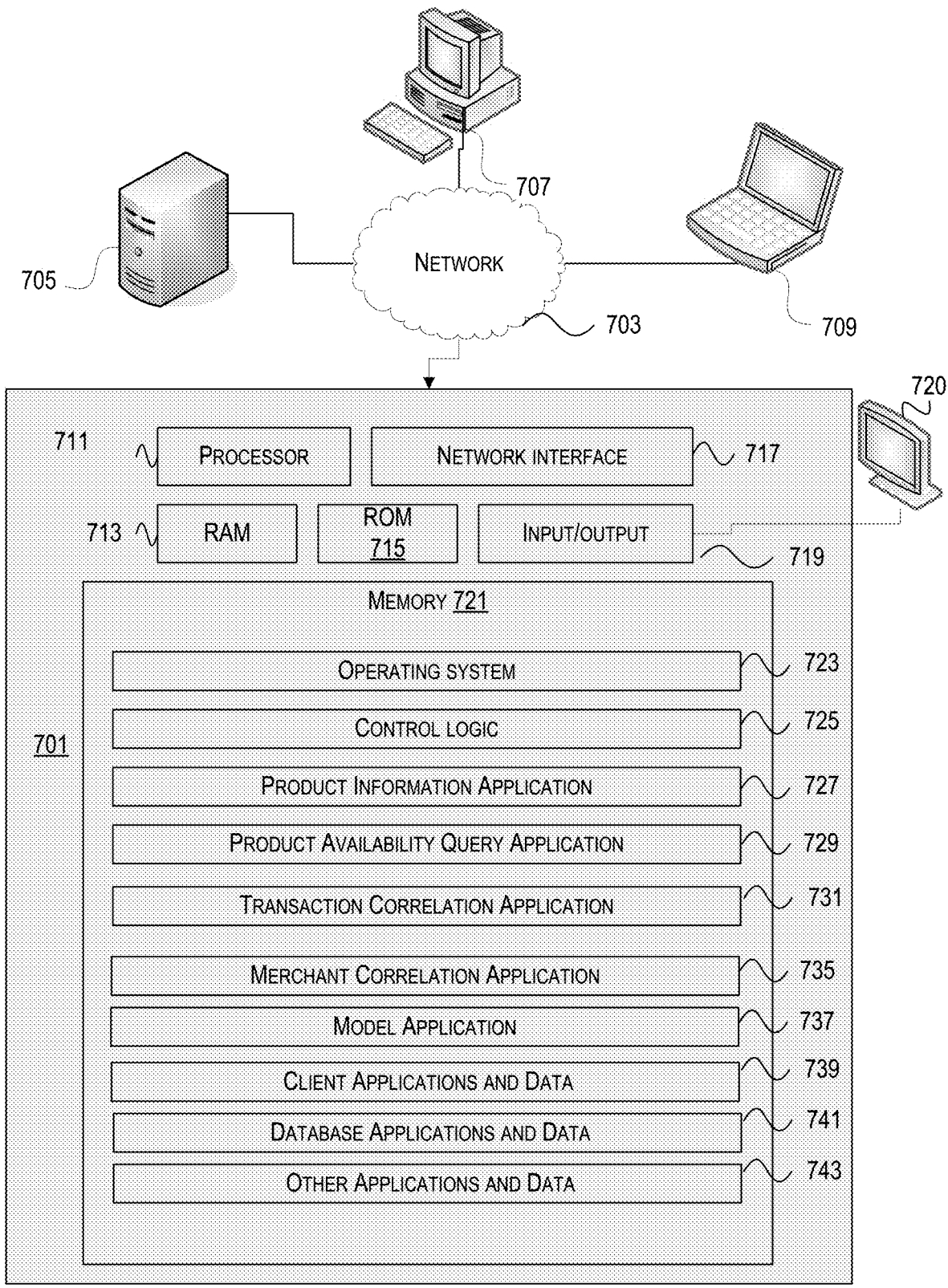
FIG. 7 illustrates an example computing device that may be used in implementing one or more aspects described herein.
Figure 8:
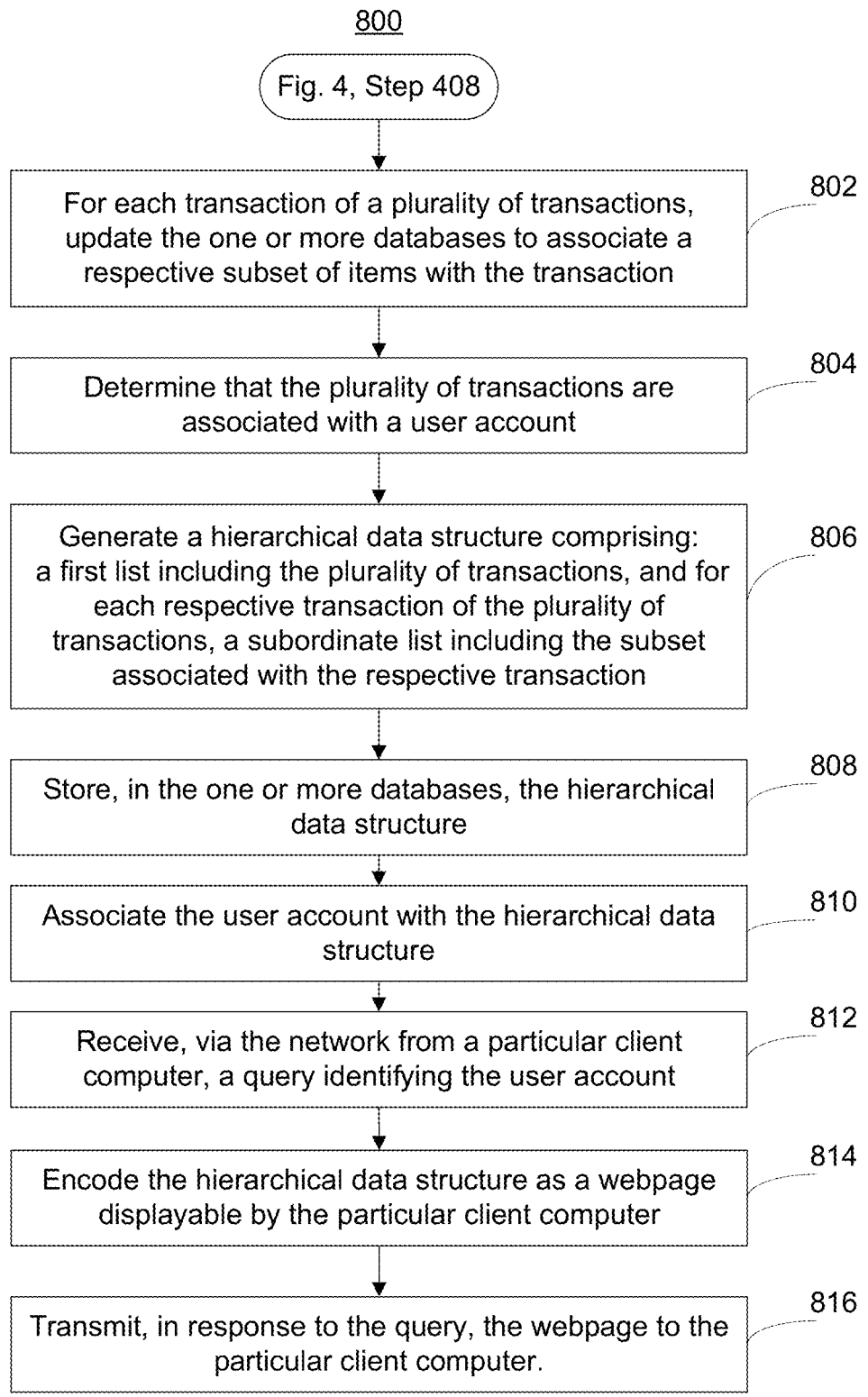
FIG. 8 illustrates an example method for creating detailed transaction reports according to one or more aspects of the disclosure.

As another example, FIG. 8 illustrates method 800 that may be included as part of method 400 after step 408, or as a separate method that implements certain steps (e.g., steps 402-408) of method 400 for creating detailed transaction reports (e.g., credit card or bank statements) that include itemized lists for each transaction. In some variations method 800 may be implemented by one or more suitable computing devices, for example by transaction correlation processor 106 (as shown in FIG. 1B) in conjunction with product information processor 103 and various processors and databases of transaction metadata service 109 and customer transaction database 108. Each of the processors and databases may be implemented with any one of computing devices 701, 705, 707, and 709 of FIG. 7. Method 800 may be implemented in suitable computer-executable instructions, such as in software 727, 731, 735, 741, and 743.

Prior to performing method 800, steps (e.g., steps 402, 404, and/or 406) may have been previously performed multiple times to determine a plurality of subsets of items that were included respectively in a plurality of transactions. In step 802, the one or more computing devices may update the one or more databases to associate the plurality of subsets respectively with the plurality of transactions.

In step 804, the one or more computing devices may further determine that the plurality of transactions are associated with a user account. For example, the user account may be a credit card account, a debit card account, a charge card account, an electronic payment service account, or the like. The transaction records that identify the transaction (e.g., as in step 406) may be associated with the account (e.g., the credit card transaction record), or may be a vendor record received from the one of the plurality of vendors, which identifies the account.

In step 806, the one or more computing devices may generate a hierarchical data structure comprising a list of the plurality of transactions. For each transaction in the list, the hierarchical data structure may further include a subordinate list of the subset of items associated with the transaction.

The one or more computing devices may, in step 808, store the hierarchical data structure in the one or more databases, and in step 810, associate the hierarchical data structure with the user account.

The hierarchical data structure may be used for example as a statement (e.g., monthly/yearly credit card bill or bank statement) that itemizes all of the transactions associated with the user account, and identifies one or more items that were included in each transaction. For example, in step 812, the one or more computing devices may receive, via the network from a particular client computer, a query identifying the user account. Such a query may be, for example, a user logging into the user account to review recent transactions.

In step 814 the one or more computing devices may (e.g., in response to the query), encode the hierarchical data structure as a webpage displayable by the particular client computer (e.g., laptop, mobile phone, or tablet). In step 816, the one or more computing devices may then transmit (e.g., in response to the query) the webpage to the particular client computer.

FIG. 5 illustrates an example method 500 (e.g., for performing step 408) to correlate a transaction cost to item information (e.g., item costs) to identify items in the transaction using a classifier model. In process 500, at step 502, one or more computing devices may receive, via the network, a transaction record identifying: one of the plurality of vendors, and a total cost of a transaction.

At step 504, one or more computing devices (e.g., transaction correlation processor 106) may retrieve, from the one or more databases, a classifier model, which uses information from the transaction records, and optionally from the browsing records, to determine particular items that were included in a transaction. The classifier model, for example, may be a set of rules generated by a person or a machine-learning model (e.g., naïve Bayes classifier) that is trained by model processor 115 shown in FIG. 1B.

At step 506, one or more computing devices (e.g., transaction correlation processor 106) may evaluate the classifier model with information from the transaction record, and optionally, from one or more of the plurality of browsing records. The information from the transaction record may include, for example, a transaction cost and vendor identity from the transaction record, as inputs to calculate a measure representing a likelihood that the particular item is included in the transaction identified in the transaction record. The classifier model may further use as input vendor/merchant metadata, for example, stored in database 112 as described above, to correlate transactions that appear to be from different vendors to the same vendor. The merchant metadata may be generated and maintained by a merchant correlation processor 113, which may collect and update the metadata in database 112, and may offload processing from transaction correlation processor 106 for correlating different transaction records to different vendors.

The browsing records may include information used by the classifier model, such as: costs for each of a plurality of items from the plurality of vendors, purchase data identifying subsets of the plurality of items purchased together, browsing history data identifying one or more of the plurality of items viewed on one or more of a plurality of websites, and/or shopping history data identifying one or more of the plurality of items purchased by an individual.

The measure may be expressed as a probability that an item was purchased. For example, the measure may be a percentage or a value from 0 to 1, with 1 representing 100% probability that the item was purchased and 0 representing 0% probability that the item was purchased (100% probability the item was not purchased). In this variation, an assumption may be made that if the item was purchased, it is still available for further purchase by others.

The confidence measures may alternatively represent a likelihood that a particular item is, or is not, available for purchase. For example, a 1 may represent 100% probability that the item is available (e.g., in-stock), and 0 may represent 0% probability that the item is available (100% probability the item is not available). In this variation, rather than assuming a purchase indicates future availability, the classifier model may determine a correlation from past purchases to current availability of an item. This correlation may for example be based on how recently the item was purchased, a quantity of the item purchased, a number of different client devices indicating a purchase, or how many different sources (e.g., vendors) the item was purchased from.

At step 508, one or more computing devices (e.g., transaction correlation processor 106) may update the one or more databases that track the availability of the particular item from the plurality of vendors based on the confidence measure. For example, a predetermined threshold (e.g., 0.8) may be used, and if the confidence measure exceeds the threshold, the database may be updated to indicate the item is available. Indicating the item is available may be based on the measure indicating a likelihood that the item was purchased combined with an assumption that if the item was purchased, it is still available to be purchased. Alternatively, indicating the item is available may be based on the confidence measure directly indicating a likelihood of availability. In certain variations, no threshold is used and the measure itself is updated in the database and reported out to a client device in response to a query (e.g., the client device 101 receives a percentage likelihood an item is available from a particular vendor).

At step 510, one or more computing devices (e.g., client device 101 and/or transaction correlation processor 106) may associate the transaction record with one of the plurality of client devices 101. For example, the transaction record may include information about a transaction performed using one of the client devices, such as a purchase of an item using application (web browser) 102A, application (browsing extension) 102B, or mobile application 102C. In another example, the transaction record may include information about a credit card transaction in which the card holder is associated with (e.g., has logged into or has an account on) a particular client device 101.

At step 512, one or more computing devices (e.g., transaction correlation processor 106) may transmit, based on the associating of a client device 101 to a transaction record in step 510, a request to associated client device to confirm that the particular item was included in the transaction identified in the transaction record. The request may go to the client device 101 (e.g., a laptop) associated with the transaction record. Alternatively, the request may go to a different client device 101, for example, a mobile phone running a mobile application, where the two client devices are associated with one another (for example, associated with the same user account).

At step 514, one or more computing devices (e.g., transaction correlation processor 106) may receive, in response to the request, a confirmation (e.g., line item verification illustrated in FIG. 1B) from the one of the plurality of client devices 101 that the particular item was or was not included in the transaction identified in the transaction record. At step 516, the one or more computing devices may update (e.g., using a machine learning algorithm), the classifier model based on the confirmation. At step 518, one or more computing devices may store the updated classifier model to the one or more databases (e.g., model database 114).

FIG. 6 illustrates an example method 600 of generating one or more classifier models for identifying items in a transaction. In some variations, method 600 may be implemented by one or more suitable computing devices, for example by model processor 115, as shown in FIG. 1B implemented with any one of computing devices 701, 705, 707, and 709 of FIG. 7. Method 600 may be implemented in suitable computer-executable instructions, such as in software 737 and 743, and include access to a database (e.g., model database 114) as illustrated in FIG. 1B.

In process 600, at step 602, one or more computing devices may retrieve, from the one or more databases (e.g., model database 114), a training dataset on which the classifier model will be based. The dataset may include different categories of information, such as: costs for each of a plurality of items from the plurality of vendors, purchase data identifying subsets of the plurality of items purchased together, browsing history data identifying one or more of the plurality of items viewed on one or more of the plurality of websites or applications, shopping history data identifying one or more of the plurality of items purchased by an individual, a plurality of transaction records for purchases by an individual, vendor records identifying one or more of the plurality of items purchased from one of the plurality of vendors, inventory records for a vendor, and/or prices of a plurality of items from the plurality of vendors. The training dataset may further include vendor/merchant metadata, for example, stored in merchant metadata database 112 as described above, and be used to correlate transactions that appear to be from different vendors to the same vendor.

The training dataset may include just one of the above categories of data or any combination of these categories, and may include different amounts of information in each category. The information in these categories may for example be extracted from browsing records, transaction records, vendor inventory data, or line item verifications received (e.g., in step 514 of method 500) from client devices that an item was purchased.

At step 604, one or more computing devices (e.g., model processor 115) may apply a machine learning algorithm to the training dataset to generate one or more classifier models. The one or more computing devices may train the one or more classifier models for determining items of a transaction based on information in transaction records and information in browsing records. The classifier models may include one or more statistical classifiers, naïve Bayes classifiers, one or more neural networks, and/or one or more other suitable machine-learning model. The training may be performed based on a supervised learning process or other suitable training process, and training dataset stored in a database (e.g., model database 114) and retrieved in step 602. For example, a training dataset may include information that correlates or associates information from a plurality of browsing records with information from a plurality of transaction records and/or information from a plurality of confirmations from a client device 101 that a particular item was purchased. Each of the classifier models may be configured to receive, as input, transaction records (or information extracted from transaction records) and browsing records (or information extracted from browsing records).

How well the models determine whether a particular item was purchased or whether a particular item is available for purchase may be measured, for example, by polling client devices and receiving confirmations/verifications (e.g., in step 514 of method 500) from client devices about particular item purchases and comparing those confirmations to the outputs of the model. Verification can also be performed by accessing business inventory database 111, which may include information about which items were in stock at a particular vendor at a particular time. Such measurements can then be used to further train the models.

At step 606, one or more computing devices may store the classifier model in the one or more databases, such as in model database 114.

While the system and methods illustrate with respect to FIGS. 1-6 have been divided into separate components performing functions in a particular order, any function or component can be embodied and performed by the same device and in different order. For example, referring to FIG. 1B, databases 104, 108, 110, 111, 112, and/or 114 may be one in the same or divided between multiple databases in any combination. Similarly, processors 103, 105, 106, 113, and/or 115 may be implemented with a single computing device or multiple computing devices in any combination. Moreover, client device 101 may perform one or more functions of processors 103, 105, 106, 113, and/or 115. For example, client device 101 may access product information database 104 directly to perform the functions of determining product availability, or access databases 108, 110, 111, 112, and 114 to correlate transaction data with browser data to determine items purchased.

FIG. 7 illustrates one example of a computing device 701 that may be used to implement one or more illustrative aspects discussed herein. For example, client device 101, processors 103, 105, 106, 113, and 115, databases 104, 108, 110, 111, 112, and 114, and other computing devices described herein may be implemented with, and the methods as described with respect to FIGS. 2-6 and any other methods described herein may be performed by, one or more computing devices 701, 705, 707, or 709 operating independently or in a networked environment. For example, computing device 701, in some embodiments, may implement one or more aspects of the disclosure by reading and/or executing instructions and performing one or more actions based on the instructions. Computing device 701 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 701, in some embodiments, may operate in a standalone environment. In others, computing device 701 may operate in a networked environment. As shown in FIG. 7, various network nodes 701, 705, 707, and 709 may be interconnected via a network 703, such as the Internet. Other networks may also or alternatively be used, including private intranets, corporate networks, LANs, wireless networks, personal networks (PAN), and the like. Network 703 is for illustration purposes and may be replaced with fewer or additional computer networks. A local area network (LAN) may have one or more of any known LAN topology and may use one or more of a variety of different protocols, such as Ethernet. Devices 701, 705, 707, 709 and other devices (not shown) may be connected to one or more of the networks via twisted pair wires, coaxial cable, fiber optics, radio waves or other communication media.

As seen in FIG. 7, computing device 701 may include a processor 711, RAM 713, ROM 715, network interface 717, input/output interfaces (I/O) 719 (e.g., keyboard, mouse, display, printer, etc.), and memory 721. Processor 711 may include one or more computer processing units (CPUs), graphical processing units (GPUs), and/or other processing units such as a processor adapted to perform computations associated with speech processing or other forms of machine-learning. I/O 719 may include a variety of interface units and drives for reading, writing, displaying, and/or printing data or files. I/O 719 may be coupled with a display such as display 720. Memory 721 may store software for configuring computing device 701 into a special purpose computing device in order to perform one or more of the various functions discussed herein. Memory 721 may store operating system software 723 for controlling overall operation of computing device 701, and control logic 725 for instructing computing device 701 to perform aspects discussed herein. Memory 721 may further store applications and data, such as a product information application 727 for implementing one or more functions of product information processor 103, product availability query application 729 for implementing one or more functions of product availability query processor 105, transaction correlation application 731 for implementing one or more functions of transaction correlation processor 106, merchant correlation application 735 for implementing one or more functions of merchant correlation processor 113, model application 737 for implementing one or more functions of model processor 115, client applications and data 739 for implementing one or more functions (e.g., applications 102A, 102B, 102C) of client device 101, and applications and data 743 for implementing any other function disclosed herein. Memory 721 may also store database applications and data 741 for implementing one or more functions of various databases disclosed herein, including databases 104, 108, 110, 111, 112, and/or 114. In other embodiments, computing device 701 may include two or more of any and/or all of these components (e.g., two or more processors, two or more memories, etc.) and/or other components and/or subsystems not illustrated here.

Devices 705, 707, 709 may have similar or different architecture as described with respect to computing device 701. Functionality of computing device 701 (or device 705, 707, 709) as described herein may be spread across multiple computing devices, for example, to distribute processing load across multiple computers, to segregate transactions based on geographic location, user access level, quality of service (QoS), etc. For example, devices 701, 705, 707, 709, and others may operate in concert to provide parallel computing features in support of the operation of system software 723, control logic 725 and/or applications 727-743.

One or more aspects discussed herein, including the functions and methods as described above with respect FIGS. 1-6 may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A computer implemented method for tracking availability of a particular item from a plurality of vendors via a plurality of websites, the method comprising:
   receiving, via a network from a plurality of client computers, a plurality of browsing records indicating that the plurality of websites were displayed via web browsers run on the plurality of client computers;
   analyzing the plurality of browsing records to determine that the plurality of websites offered the particular item for sale from the plurality of vendors, wherein each of the plurality of websites is associated with a different one of the plurality of vendors;
   determining, based on the analyzing of the plurality of browsing records, information about the availability of the particular item from the plurality of vendors;
   updating, based on the information determined from the plurality of browsing records, one or more databases that track an availability of the particular item from the plurality of vendors;
   receiving, via the network from a particular client computer, a query for the availability of the particular item from the plurality of vendors;
   retrieving, from the one or more databases and based on the query, an indication that the particular item is available at a particular time from a subset of the plurality of vendors; and
   transmitting, based on the indication, an alert notifying the particular client computer that the particular item is available at the particular time from the subset of the plurality of vendors.

2. The computer implemented method of claim 1, further comprising:
   determining, in response to the query, that the one or more databases indicates that the particular item is not available from any of the plurality of vendors at an initial time after the query is received;
   maintaining the query in a queue of pending queries; and
   determining, based on the updating and the maintaining, that the particular item has become available at the particular time, after the initial time, from the subset of the plurality of vendors, wherein the transmitting of the alert is based on the determining that the particular item has become available at the particular time.

3. The computer implemented method of claim 1, wherein each of the plurality of browsing records identifies that the particular item is available for sale from one of the plurality of vendors by identifying: a quantity in stock of the particular item, that the particular item is available for immediate purchase, or that the particular item is available for purchase at a future time.

4. The computer implemented method of claim 1, wherein one of the plurality of browsing records identifies that the particular item is available for sale from one of the plurality of vendors by identifying that the particular item was purchased with one of the plurality of client computers via one of the plurality of websites.

5. The computer implemented method of claim 1, wherein:
   the particular client computer is one of the plurality of client computers, and
   the alert comprises instructions to modify a display of the one of the plurality of websites to include a list of the subset of the plurality of vendors.

6. The computer implemented method of claim 5, wherein the list includes hyperlinks to a subset of the plurality of websites associated respectively with the subset of the plurality of vendors.

7. The computer implemented method of claim 1,
wherein the plurality of browsing records:
   indicate that the particular item is one of a plurality of items offered for sale by the plurality of vendors, and
   identify individual costs of each of the plurality of items from the plurality of vendors; and
wherein the method further comprises:
   receiving, via the network, a transaction record identifying: one of the plurality of vendors, and a total cost of a transaction;
   correlating the total cost of the transaction with the individual costs to identify a subset of the plurality of items included in the transaction; and
   determining that the particular item is included in the subset of the plurality of items, wherein the updating of the one or more databases that track the availability of the particular item from the plurality of vendors is further based on the particular item being included in the subset of the plurality of items.

8. The computer implemented method of claim 7, wherein the correlating comprises:
   calculating, for each item of the plurality of items, a confidence measure representing a likelihood that the item is included in the transaction;
   comparing the confidence measure for each item of the plurality of items to a threshold; and
   including, in the subset of the plurality of items, each item of the plurality of items having its confidence measure exceeding the threshold.

9. The computer implemented method of claim 7, wherein the transaction record identifies a credit card used for the transaction, or a vendor record received from the one of the plurality of vendors.

10. The computer implemented method of claim 1, further comprising:
   receiving, via the network, a transaction record identifying: one of the plurality of vendors, and a total cost of a transaction;
   retrieving, from the one or more databases, a classifier model; and
   evaluating the classifier model with information from one or more of the plurality of browsing records and information from the transaction record as inputs to determine a likelihood that the particular item is included in the transaction identified in the transaction record, wherein the updating of the one or more databases that track the availability of the particular item from the plurality of vendors is further based on the likelihood.

11. The computer implemented method of claim 10, further comprising:
associating the transaction record with one of the plurality of client computers;
transmitting, based on the associating, a request to the one of the plurality of client computers to confirm that the particular item was included in the transaction identified in the transaction record;
receiving, in response to the request, a confirmation from the one of the plurality of client computers that the particular item was included in the transaction identified in the transaction record; and
updating, using a machine learning algorithm, the classifier model based on the confirmation.

12. The computer implemented method of claim 10, further comprising:
retrieving, from the one or more databases, a training dataset that includes: costs for each of a plurality of items from the plurality of vendors, purchase data identifying multiple items of the plurality of items purchased together, browsing history data identifying one or more of the plurality of items viewed on one or more of the plurality of websites, shopping history data identifying one or more of the plurality of items purchased by an individual, a plurality of transaction records for purchases by the individual, or vendor records identifying one or more of the plurality of items purchased from one of the plurality of vendors;
applying a machine learning algorithm to the training dataset to generate the classifier model; and
storing the classifier model in the one or more databases.

13. A server comprising:
at least one computer processor; and
computer memory comprising computer-executable instructions that when executed by the at least one computer processor, cause the server to:
receive, via a network from a particular client computer, a query for availability of a particular item from a plurality of vendors;
retrieve, from one or more databases and based on the query, data that tracks the availability of the particular item from the plurality of vendors;
determine, based on the data, that the particular item is not available from any of the plurality of vendors at an initial time after the query is received;
maintain, based on the determination that the particular item is not available from any of the plurality of vendors at the initial time, the query in a queue of pending queries;
receive, after the initial time via the network from a plurality of client computers, a plurality of browsing records indicating that: a plurality of websites were displayed via web browsers run on the plurality of client computers, and the plurality of websites offered the particular item for sale from the plurality of vendors;
update, based on the plurality of browsing records, the data stored in the one or more databases;
determine, from the updated data stored in one or more databases and based on the pending queries, that the particular item has become available at a particular time, after the initial time, from a subset of the plurality of vendors; and transmit, in response to the determination that the particular item has become available at the particular time, an alert notifying the particular client computer that the particular item is available at the particular time from the subset of the plurality of vendors.

14. The server of claim 13, wherein the plurality of browsing records identify that the particular item is available for sale from one of the plurality of vendors by indicating that the plurality of websites presented: a quantity in stock of the particular item, that the particular item is available for immediate purchase, that the particular item is available for purchase at a future time, or that the particular item was purchased via one of the plurality of websites.

15. The server of claim 13, wherein:
the particular client computer is one of the plurality of client computers, and
the alert comprises instructions to modify a display of one of the plurality of websites to include a list of the subset of the plurality of vendors.

16. The server of claim 13, wherein the plurality of browsing records indicate an individual cost of the particular item from one of the plurality of vendors, and wherein the computer-executable instructions, when executed by the at least one computer processor, cause the server to:
receive, via the network, a transaction record identifying: one of the plurality of vendors, and a total cost of a charge to a credit card;
determine there is a correlation between the total cost of the charge to the credit card with the individual cost of the particular item from the one of the plurality of vendors; and
update the data stored in the one or more databases further based on the correlation.

17. The server of claim 16, wherein to determine the correlation between the total cost of the charge to the credit card with the individual cost of the particular item from the one of the plurality of vendors, the computer-executable instructions, when executed by the at least one computer processor, cause the server to:
calculate a confidence measure representing a likelihood that the particular item was purchased with the charge to the credit card;
compare the confidence measure to a threshold; and
determine the particular item was bought from the one of the plurality of vendors based on the confidence measure exceeding the threshold.

18. A non-transitory machine-readable medium having instructions stored thereon that, when executed by one or more processors, cause the one or more processors to:
receive, via a network from a plurality of client computers, a plurality of browsing records indicating that: a plurality of websites were displayed via web browsers run on the plurality of client computers, and the plurality of websites offered a plurality of items for sale from a plurality of vendors, wherein each of the plurality of websites is associated with a different one of the plurality of vendors;
receive, via the network, a transaction record identifying: one of the plurality of vendors, and a total cost of a transaction;
retrieve, from one or more databases, a classifier model;
evaluate the classifier model with information from one or more of the plurality of browsing records and information from the transaction record as inputs to determine a confidence measure representing a likelihood that a particular item of the plurality of items is included in the transaction;

update, based on the confidence measure determined from evaluating the one or more of the plurality of browsing records and information from the transaction record, data stored in the one or more databases that tracks availability of the particular item from the plurality of vendors;

receive, via the network from a particular client computer, a query for the availability of the particular item from a plurality of vendors;

determine, from the data stored in one or more databases, that the particular item is presently available from a subset of the plurality of vendors; and transmit, to the particular client computer, a response to the query notifying the particular client computer that the particular item is presently available from the subset of the plurality of vendors.

19. The non-transitory machine-readable medium of claim 18, wherein the response comprises instructions to modify a display of one of the plurality of websites to include a list of the subset of the plurality of vendors.

20. The non-transitory machine-readable medium of claim 19, wherein the response comprises instructions to modify the display of the one of the plurality of websites to include hyperlinks to a subset of the plurality of websites associated respectively with the subset of the plurality of vendors.

* * * * *